United States Patent [19]

McAllister

[11] Patent Number: 5,287,250
[45] Date of Patent: Feb. 15, 1994

[54] MUZZLE-LOADER BORE LIGHT APPARATUS

[76] Inventor: Robert D. McAllister, HCR 1, Box 64, Fort Jackson, N.Y. 12965

[21] Appl. No.: 44,831

[22] Filed: Apr. 12, 1993

[51] Int. Cl.[5] .................. F21L 7/00; F21L 15/02; F21V 8/00
[52] U.S. Cl. ........................ 362/32; 362/110; 362/157
[58] Field of Search .................. 362/31, 32, 157, 122, 362/123, 200, 208, 110

[56] References Cited
U.S. PATENT DOCUMENTS

| | | | |
|---|---|---|---|
| 3,184,589 | 5/1965 | Gibbens | 362/208 |
| 3,373,737 | 3/1968 | Moore et al. | 362/208 |
| 4,924,358 | 5/1990 | Von Heck | 362/32 |
| 4,950,202 | 8/1990 | Florio | 362/32 |
| 5,093,763 | 3/1992 | Vanderschuit et al. | 362/32 |
| 5,126,922 | 6/1992 | Andreasen | 362/32 |

Primary Examiner—Richard R. Cole
Attorney, Agent, or Firm—Leon Gilden

[57] ABSTRACT

An illumination structure arranged for projection within a muzzle bore of an associated black powder type muzzle-loader includes an elongate tube mounting an illumination structure for permitting viewing within the bore for bore condition.

2 Claims, 4 Drawing Sheets

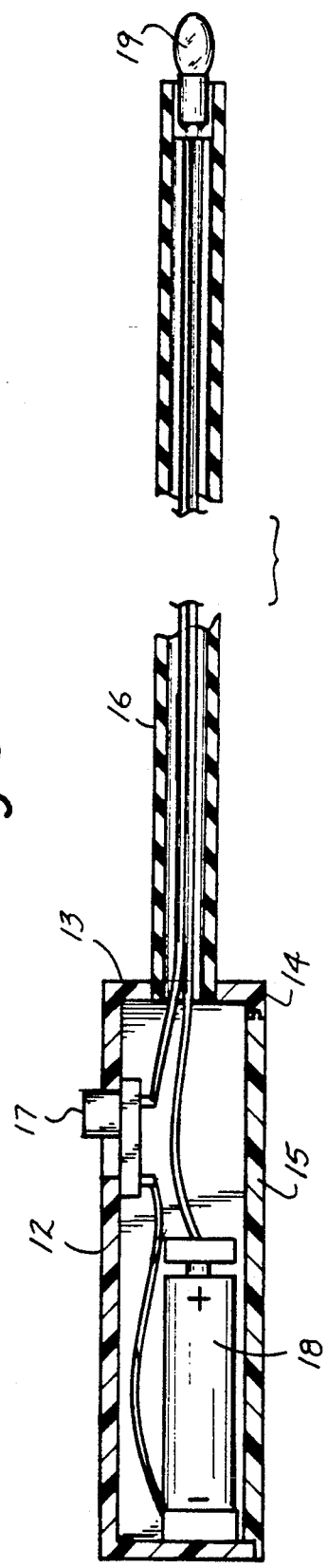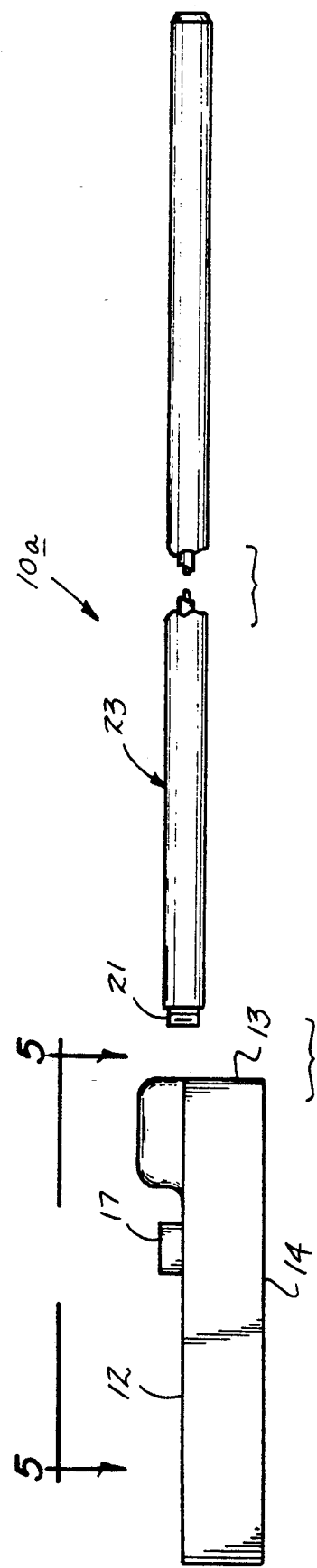

MUZZLE-LOADER BORE LIGHT APPARATUS

BACKGROUND OF THE INVENTION

1. Field of the Invention

The field of invention relates to bore light structure, and more particularly pertains to a new and improved muzzle-loader bore light apparatus wherein the same is arranged for viewing within an interior bore of a firearm.

2. Description of the Prior Art

Bore lights per se have been utilized in the prior art for viewing within the bore for permitting optical illumination therewithin. Elongate tubular structure mounting a light is indicated in U.S. Pat. No. 4,306,277, as well as U.S. Pat. No. 4,544,990.

The instant invention attempts to overcome deficiencies of the prior art by providing for a bore light particularly and uniquely adapted for the viewing within a firearm bore of a muzzle-loader that has limited access thereto and in this respect, the present invention substantially fulfills this need.

Muzzle-loading firearm structure typically is of greater lengths due to the chemical characteristics of black powder requiring a greater bore to permit full generation of power upon detonation of a powder charge. To this end prior art has not availed in the viewing within such elongate firearm bores, wherein the instant invention provides illumination at a distal end of an elongate tubular structure for insertion within a muzzle-loading firearm bore to overcome this deficiency.

SUMMARY OF THE INVENTION

In view of the foregoing disadvantages inherent in the known types of bore light apparatus now present in the prior art, the present invention provides a muzzle-loader bore light apparatus having an elongate tube for insertion within a muzzle-loading bore of a firearm. As such, the general purpose of the present invention, which will be described subsequently in greater detail, is to provide a new and improved muzzle-loader bore light apparatus which has all the advantages of the prior art bore light apparatus and none of the disadvantages.

To attain this, the present invention provides an illumination structure arranged for projection within a muzzle bore of an associated black powder type muzzle-loader, including an elongate tube mounting an illumination structure for permitting viewing within the bore for bore condition.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved muzzle-loader bore light apparatus which has all the advantages of the prior art bore light apparatus and none of the disadvantages.

It is another object of the present invention to provide a new and improved muzzle-loader bore light apparatus which may be easily and efficiently manufactured and marketed.

It is a further object of the present invention to provide a new and improved muzzle-loader bore light apparatus which is of a durable and reliable construction.

An even further object of the present invention is to provide a new and improved muzzle-loader bore light apparatus which is susceptible of a low cost of manufacture with regard to both materials and labor, and which accordingly is then susceptible of low prices of sale to the consuming public, thereby making such muzzle-loader bore light apparatus economically available to the buying public.

Still yet another object of the present invention is to provide a new and improved muzzle-loader bore light apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such decription makes reference to the annexed drawings wherein:

FIG. 3 is an orthographic cross-sectional illustration of the invention.

FIG. 4 is an orthographic view indicating a modified aspect of the invention.

DESCRIPTION OF THE PREFERRED EMBODIMENT

Figure 1:
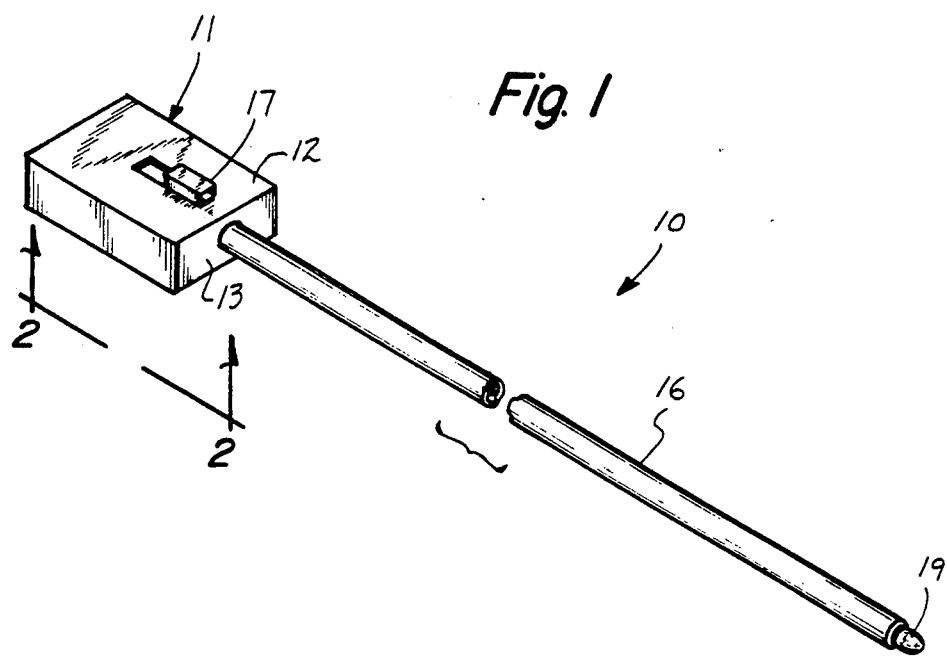
FIG. 1 is an isometric illustration of the invention.
Figure 2:
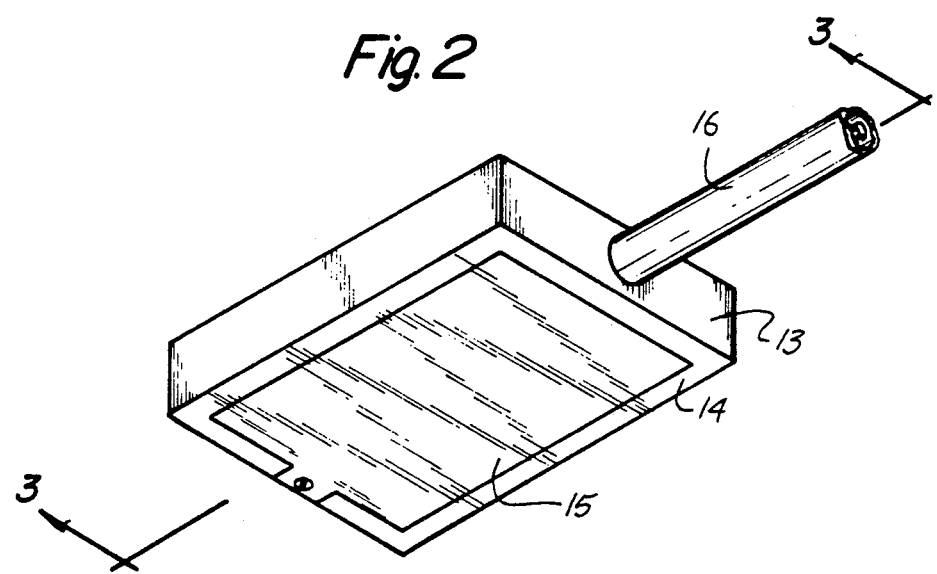
FIG. 2 is an isometric partial view indicating the bottom wall of the housing structure.
Figure 5:
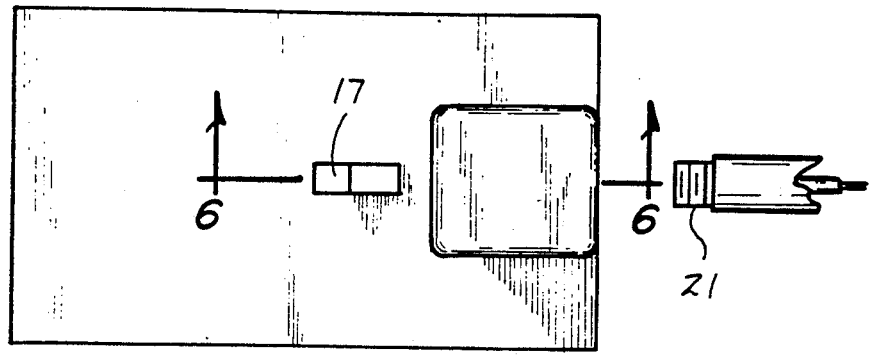
FIG. 5 is an orthographic view, taken along the lines 5—5 of FIG. 4 in the direction indicated by the arrows.

With reference now to the drawings, and in particular to FIGS. 1 to 8 thereof, a new and improved muzzle-loader bore light apparatus embodying the principles and concepts of the present invention and generally designated by the reference numerals 10 and 10a will be described.

More specifically, the muzzle-loader bore light apparatus 10 of the instant invention essentially comprises a housing 11 having a top wall 12 spaced from a bottom wall 14, as well as a front wall 13, wherein the bottom wall 14 includes a bottom wall door 15 arranged for access to an interior cavity of the housing 11 mounting at least one battery 18 therewithin permitting ease of access to the battery for its replacement. An on/off switch 17 is mounted to the housing in operative communication with the battery 18 and an illumination bulb 19 through a conventional D.C. circuit. The illumination bulb 19 is mounted at the forward distal end of the elongate opaque tube 16 that in turn is orthogonally mounted to the housing front wall 13 for its projection within an associated bore of a muzzle-loading firearm.

Figure 6:
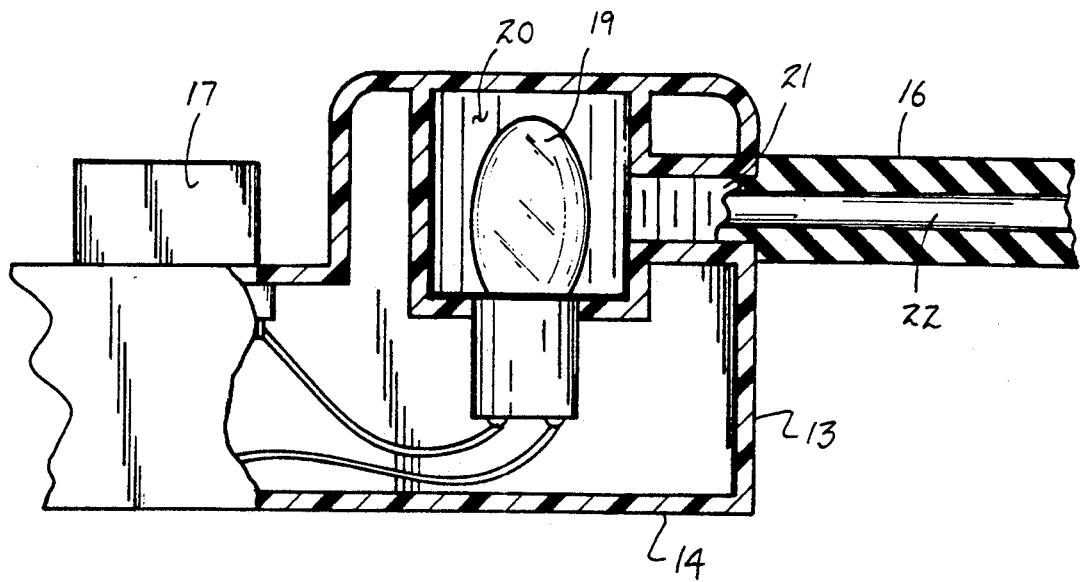
FIG. 6 is an orthographic view, taken along the lines 6—6 of FIG. 5 in the direction indicated by the arrows.

The FIG. 6 indicates a modified apparatus 10a, wherein a modified tube 23 is provided having at its rear distal end a threaded insert 21 arranged for reception within the housing 11 in communication with a bulb cavity 20 mounting the illumination bulb 19 therewithin the housing, as illustrated in FIG. 6 for example. Coaxially directed through the tube is a fiber optic cable 22 coextensive with the tube extending from the rearward end to the forward end, whereupon illumination by the bulb 19 projects illumination along the fiber optic cable 22 for viewing within the muzzle bore of an associated firearm (not shown). The illumination bulb 19 in this construction of FIG. 6 for example is operative through the on/off switch 17 and the battery 18.

Figure 7:
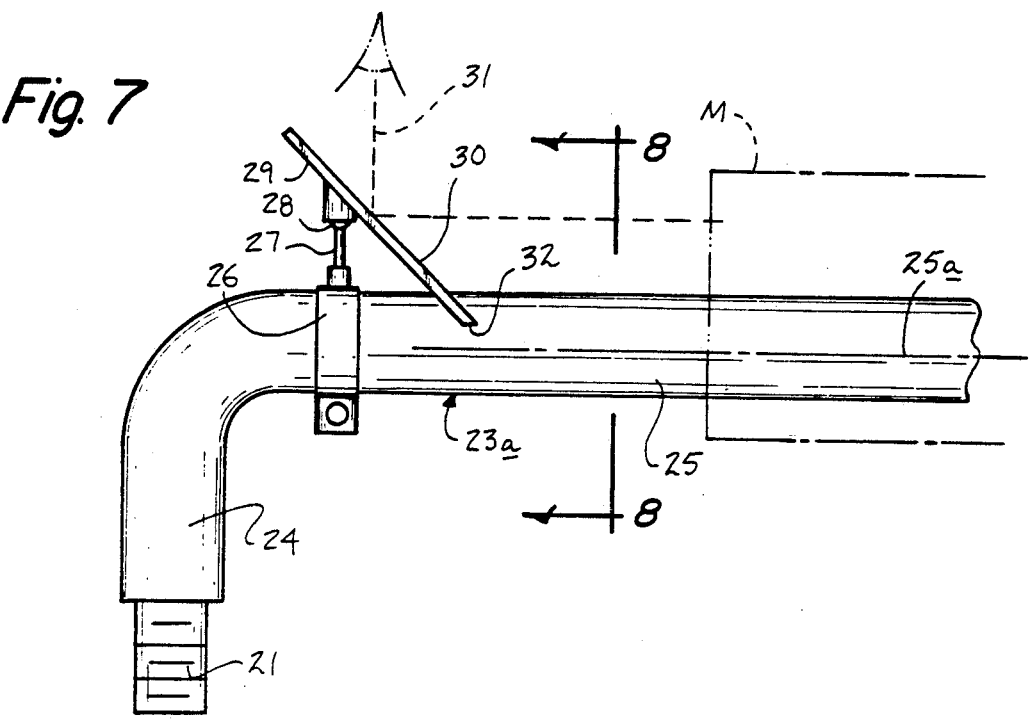
FIG. 7 is an orthographic view of a modified tube structure of the invention.
Figure 8:
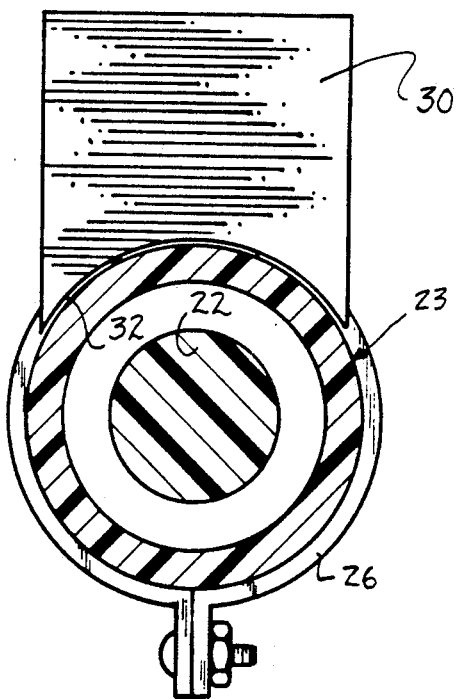
FIG. 8 is an orthographic view, taken along the lines 8—8 of FIG. 7 in the direction indicated by the arrows.

The FIGS. 7 and 8 indicates the use of a modified tube structure 23a having a first leg 24 oriented at an oblique angle relative to a second leg 25, with the fiber optic cable 22 coextensive with the modified tube 23a, in a manner as described above, such that the housing 11 is displaced relative to the second leg 25. Further, a clamp member 26 is mounted to the second leg 25 adjacent the first leg 24 such that the clamp member 26 includes a support rod 27 fixedly mounted thereto, wherein the support rod 27 includes a spherical rod end 28 pivotally mounted within a socket 29 that in turn mounts a mirror plate 30 to permit orienting of the mirror plate 30 at an acute included angle relative to the second leg axis 25a, wherein a line of sight 31 directed along the mirror plate 30 is arranged for reception within the muzzle bore of the muzzle "M", as indicated in FIG. 7, when the second leg 25 is inserted within the muzzle bore permitting simultaneous illumination and viewing within the muzzle for its inspection. As indicated in FIG. 8 for example, the mirror plate lowermost end 32 in adjacency to the second leg 25 is such that the lowermost end 32 is of a U-shaped configuration to complementarily receive the second leg 23 therewithin the lowermost end 32 to provide for a greater mirrored surface area for viewing within the muzzle bore.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A muzzle-loader bore sight apparatus, comprising,
   a housing, the housing having a top wall spaced from a bottom wall, and a front wall, and
   a battery member contained within the housing, and
   and on/off switch mounted to the housing in electrical communication with the battery, and
   an elongate tube mounted to the front wall, and
   the tube having a tube forward end spaced from the housing and tube rear end arranged for abutment with the front wall, and
   illumination means in operative communication with the housing for directing illumination from the tube forward end, and
   the illumination means includes an illumination bulb mounted within the housing, and wherein the housing includes a bulb cavity compartment within the housing having an illumination bulb contained therewithin, with the illumination bulb in electrical communication with the on/off switch and the battery, and the tube rear end arranged for reception within the bulb cavity, and the illumination means further including a fiber optic cable coextensive with the tube extending from the tube rear end to the tube forward end, with the fiber optic cable arranged in adjacency to the illumination bulb for directing illumination from the tube forward end, and
   the tube rear end further includes an externally threaded portion arranged for threaded reception through the housing permitting removal of the tube relative to the housing for storage and transport of the tube and the housing, and
   the tube includes a tube first leg and a tube second leg, wherein the tube first leg and the tube second leg are arranged in an oblique angle relative to one another, and the tube having a clamp member mounted to the second leg in adjacency to the first leg, the clamp member including a support rod fixedly mounted to the clamp member, the support rod including a spherical rod end spaced from the second leg, and a socket mounted to the spherical rod end, and the socket having a mirror plate fixedly mounted to the socket, with the second leg having a second leg axis, and the mirror plate oriented at an acute included angle relative to the axis permitting viewing within a barrel bore when the second leg is directed into the barrel bore.

2. An apparatus as set forth in claim 1 wherein the mirror plate includes a mirror plate lowermost end, and the mirror plate lowermost end is of a generally U-shaped configuration receiving the second leg therewithin.

* * * * *